United States Patent
Tsai et al.

(10) Patent No.: US 12,520,596 B2
(45) Date of Patent: Jan. 6, 2026

(54) METHOD FOR SEMICONDUCTOR MANUFACTURING AND SYSTEM FOR ARRANGING A LAYOUT

(71) Applicant: TAIWAN SEMICONDUCTOR MANUFACTURING COMPANY LTD., Hsinchu (TW)

(72) Inventors: Chun-Chi Tsai, Hsinchu (TW); Jung-Chan Yang, Taoyuan County (TW); Hui-Zhong Zhuang, Kaohsiung (TW); Chih-Liang Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 898 days.

(21) Appl. No.: 17/728,675

(22) Filed: Apr. 25, 2022

(65) Prior Publication Data

US 2023/0343775 A1  Oct. 26, 2023

(51) Int. Cl.
*H10D 89/10* (2025.01)
*G06F 30/392* (2020.01)
*H10D 84/01* (2025.01)
*H10D 84/03* (2025.01)

(52) U.S. Cl.
CPC ........... *H10D 89/10* (2025.01); *G06F 30/392* (2020.01); *H10D 84/017* (2025.01); *H10D 84/0179* (2025.01); *H10D 84/0186* (2025.01); *H10D 84/0191* (2025.01); *H10D 84/038* (2025.01)

(58) Field of Classification Search
CPC .. H10D 89/10; H10D 84/017; H10D 84/0179; H10D 84/0186; H10D 84/0191; H10D 84/038; H10D 84/85; G06F 30/392; G06F 2119/18; G06F 30/39; G06F 30/398
USPC ......................................................... 716/119
See application file for complete search history.

(56) References Cited

U.S. PATENT DOCUMENTS

2019/0267389 A1*  8/2019  Choi ................... H10D 30/0411

\* cited by examiner

*Primary Examiner* — Paul Dinh
(74) *Attorney, Agent, or Firm* — WPAT LAW; Anthony King

(57) ABSTRACT

A method for semiconductor manufacturing is provided. The method includes defining a first cell level group comprising a first set of pattern features corresponding to a predetermined manufacturing process associated with an layout; determining a first number of cell units based on the first cell level group, wherein each of the first number of cell units is compatible with each other; defining a second cell level group comprising the first set of pattern features and a second set of pattern features; and determining a second number of cell units based on the second cell level group, wherein each of the second number of cell units is compatible with each other. The first set of pattern features and the second set of pattern features are arranged in responsive to sequential operations of the predetermined manufacturing process.

20 Claims, 11 Drawing Sheets

METHOD FOR SEMICONDUCTOR MANUFACTURING AND SYSTEM FOR ARRANGING A LAYOUT

BACKGROUND

The present disclosure relates, in general, to method and system for semiconductor manufacturing. Specifically, the present disclosure relates to method and system for semiconductor manufacturing by arranging a layout.

In the design of an integrated circuit, standard cells having predetermined functions are used. Pre-designed layouts of standard cells are stored in cell libraries. When designing an integrated circuit, the pre-designed layouts of the standard cells are retrieved from the cell libraries and placed into one or more desired locations on an integrated circuit layout. Routing is then performed to connect the standard cells with each other using metal lines. The integrated circuit layout is thereafter used to manufacture the integrated circuit using a predetermined semiconductor manufacturing process. However, there are restrictions on the pre-designed layouts of the standard cells.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures can be arbitrarily increased or reduced for clarity of discussion.

DETAILED DESCRIPTION

Figure 1:
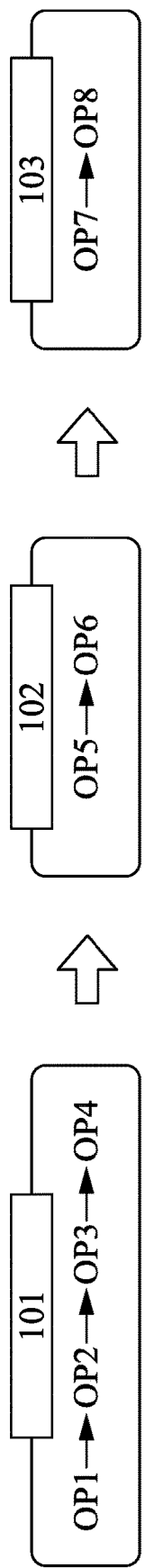
FIG. 1 illustrates a predetermined manufacturing process, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 illustrates a predetermined manufacturing process 10, in accordance with some embodiments of the present disclosure. The predetermined manufacturing process 10 can be used to form a semiconductor product or an IC device. The semiconductor product can be an electrical device. The semiconductor product can be a system of integrated circuits (IC).

The predetermined manufacturing process 10 includes front-end (FE) process 101, middle-end (ME) process 102 and back-end (BE) process 103. The front-end process 101, middle-end process 102 and back-end process 103 can be executed sequentially to manufacture a semiconductor product. The semiconductor product can be an electrical device. The semiconductor product can be a system of integrated circuits (IC).

The predetermined manufacturing process 10 may include a series of operations to generate the semiconductor product. Specifically, a first set of operations can be included in the FE process 101, a second set of operations can be included in the ME process 102, and a third set of operations can be included in the BE process 103. In some embodiments, the operations of the FE process 101, the ME process 102 and the BE process 103 may be different. In some embodiments, at least one of the operations of the FE process 101, the ME process 102 and the BE process 103 may be the same.

As an exemplary embodiment illustrated in FIG. 1, the FE process 101 may include four operations OP1 to OP4, the ME process 102 may include two operations OP5 and OP6, and the BE process 103 may include two operations OP7 and OP8. In some embodiments, the operations OP1 to OP8 can be any one or a combination of the followings: N-type well, P-type well, oxide diffusion structure, gate structure, drain/source structure, N-type implant structure, P-type implant structure, metallization structure, continuous gate structure, discrete gate structure, continuous drain/source structure and discrete drain/source structure.

In some embodiment, the operation OP1 may include, but not limited to, forming an N-type well or a P-type well. The operation OP2 may include, but not limited to, forming an oxide diffusion structure. The operation OP3 may include, but not limited to, forming a gate structure. The operation OP4 may include, but not limited to, forming an N-type implant structure or a P-type implant structure. The operation OP5 may include, but not limited to, excluding a discrete gate structure. The operation OP6 may include, but not limited to, excluding a continuous drain/source structure. The operation OP7 may include, but not limited to, forming a drain/source/gate conductive structure. The operation OP8 may include, but not limited to, forming a metallization structure.

Figure 2:
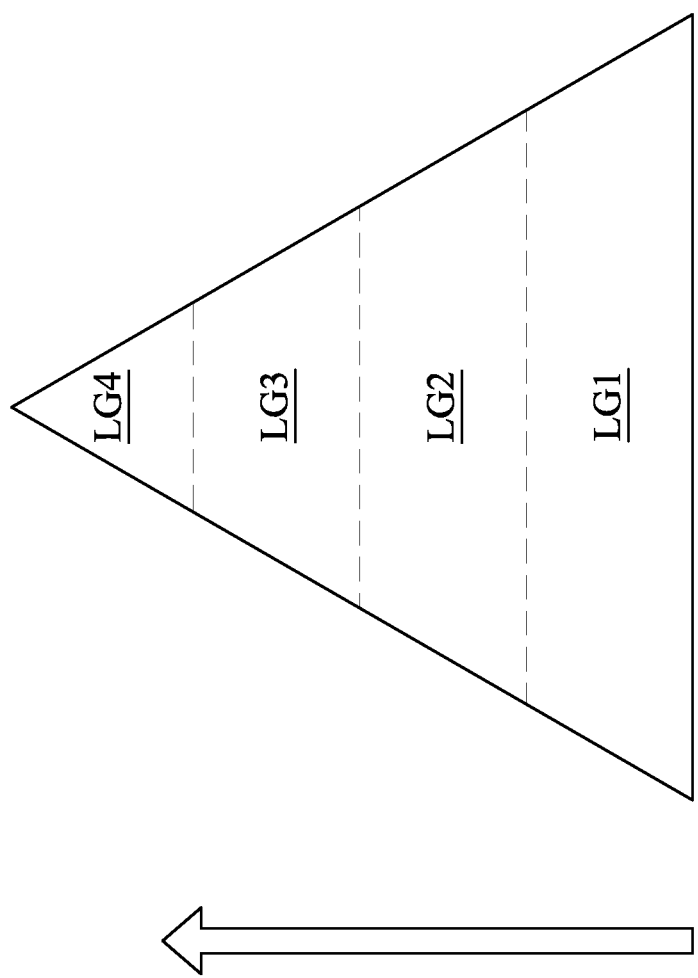
FIG. 2 illustrates multiple cell level groups for semiconductor manufacturing, in accordance with some embodiments of the present disclosure.

FIG. 2 illustrates multiple cell level groups LG1 to LG4 for semiconductor manufacturing, in accordance with some embodiments of the present disclosure. The method of semiconductor manufacturing can be performed from bottom level (such as cell level group LG1) to top level (such as cell level group LG4). The method of semiconductor manufacturing can be executed according to the sequence of the FE process 101, the ME process 102 and the BE process 103 as shown in FIG. 1.

In some embodiments, the cell level group LG1 and the cell level group LG2 correspond to the FE process 101, the cell level group LG2 corresponds to the ME process 102, and the cell level group LG4 corresponds to the BE process 103. In some embodiments, the cell level group LG1 corresponds to the FE process 101, the cell level group LG2 and the cell level group LG3 correspond to the ME process 102, and the cell level group LG4 corresponds to the BE process 103. In some embodiments, the cell level group LG1 corresponds to the FE process 101, the cell level group LG2 corresponds to the ME process 102, and the cell level group LG3 and the cell level group LG4 correspond to the BE process 103.

In some embodiments, each of the cell level groups LG1 to LG4 can include a set of pattern features corresponding to a predetermined manufacturing process 10 to generate a layout of a cell unit. The cell unit can include AND, OR, NAND, NOR, XOR, INV, AND-OR-Invert (AOI), OR-AND-Invert (OAI), MUX, Flip-flop, BUFF, Latch, delay, or clock cells. In some embodiments, each of the standard cells includes at least one active device, such as a metal-oxide semiconductor field effect transistor, a junction field effect transistor, a bipolar junction transistor, or other suitable active device.

In some embodiments, the cell level groups LG1 to LG4 have different pattern features. The pattern features of the cell level group LG1 may be less than the pattern features of the cell level group LG2. The pattern features of the cell level group LG2 may be less than the pattern features of the cell level group LG3. The pattern features of the cell level group LG3 may be less than the pattern features of the cell level group LG4.

The pattern features can include one of a combination of the operations OP1 to OP8 of the predetermined manufacturing process 10. In some embodiments, the pattern features of the cell level group LG1 correspond to the operations OP1 to OP3 of the FE process 101. The pattern features of the cell level group LG2 correspond to the operations OP1 to OP4 of the FE process 101. The pattern features of the cell level group LG3 correspond to the operations OP1 to OP4 of the FE process 101 and the operation OP5 of the ME process 102. The pattern features of the cell level group LG4 correspond to the operations OP1 to OP4 of the FE process 101 and the operations OP5 and OP6 of the ME process 102.

In some embodiments, more than four cell level groups can be created to generate the layout for manufacturing the cell unit. For example, the cell level group LG5 can be created, and the pattern features of the cell level group LG5 correspond to the operations OP1 to OP4 of the FE process 101, the operations OP5 and OP6 of the ME process 102, and the operation OP7 of the BE process 103. The cell level group LG6 can be created, and the pattern features of the cell level group LG6 correspond to the operations OP1 to OP4 of the FE process 101, the operations OP5 and OP6 of the ME process 102, and the operations OP7 and OP8 of the BE process 103.

Figure 3A:
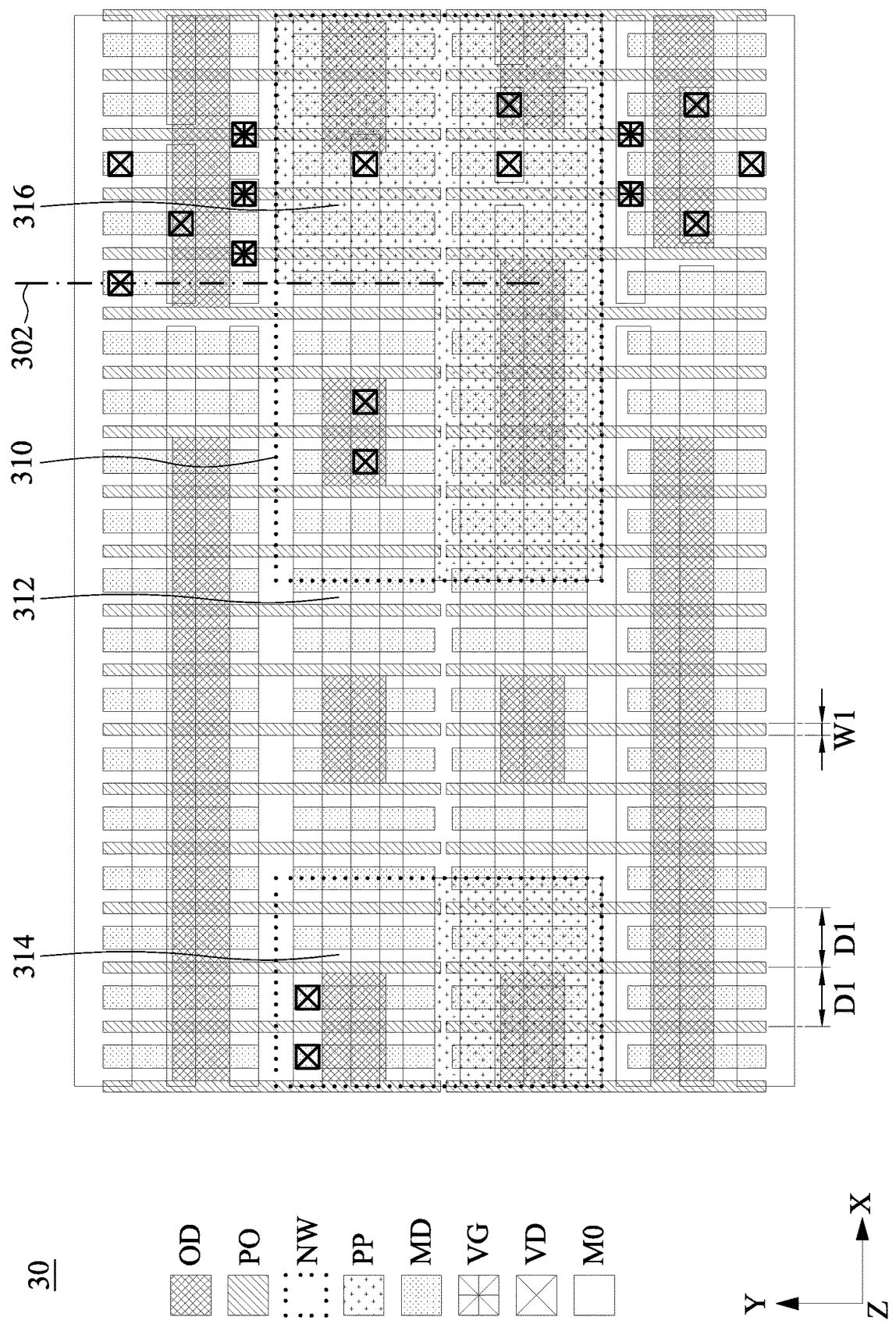
FIG. 3A illustrates a top view of a layout for semiconductor manufacturing, in accordance with some embodiments of the present disclosure.

FIG. 3A illustrates a top view of a layout 30 for semiconductor manufacturing, in accordance with some embodiments of the present disclosure. The denotation "OD" can refer to the pattern feature of oxide diffusion structure. In some embodiments, the OD can include an active region of the semiconductor device. The active region can include one or more fin structures for forming, for example, Fin Field-Effect Transistor (FinFET). In other embodiments, the active region can include one or more nanosheet structures.

The denotation "PO" can refer to the pattern feature of gate structure. In some embodiments, the gate structure can include a gate dielectric layer and a gate electrode layer. The gate dielectric layer may be a single layer or multiple layers. The gate dielectric layer may include silicon oxide (SiOx), silicon nitride (SixNy), silicon oxynitride (SiON), or a combination thereof. The gate electrode layer can be disposed on the gate dielectric layer. The gate electrode layer can be made of conductive material, such as polysilicon, aluminum (Al), copper (Cu), tungsten (W), titanium (Ti), tantalum (Ta), or other applicable materials. In some embodiments, the gate electrode layer includes a work function layer. The work function layer is made of metal material, and the metal material may include N-work-function metal or P-work-function metal.

The denotation "MD" can refer to the pattern feature of drain/source structure. In some embodiments, the patterns of the MD conductive features are arranged as source/drain (S/D) contacts that are electrically connected to source regions and/or drain regions of a semiconductor device. The MD conductive feature can include a barrier layer and a conductive layer on the barrier layer. The barrier layer may include titanium, tantalum, titanium nitride, tantalum nitride, manganese nitride or a combination thereof. The conductive layer may include metal, such as tungsten (W), copper (Cu), Ru, Ir, Ni, Os, Rh, Al, Mo, Co, alloys thereof, or combinations thereof.

The denotation "M0" can refer to the pattern feature of metallization structure. The metallization structure can correspond to metallization layers of a semiconductor device, such as the zero metal layer. The M0 of the metallization layers can be electrically connected to the gate structure or MD conductive feature through a conductive via. In this disclosure, the term "M0" or "M0 of the metallization layers" can refer to the lowest metallization layer of a semiconductor device configured to electrically connect the gate structure (or MD conductive feature) to upper metallization layers, such as M1, M2, and so on.

In some embodiments, the denotation "NW" can refer to the pattern feature of N-type well. The denotation "PP" can refer to the pattern feature of P-type implant structure. The denotation "VG" can refer to the pattern feature of gate electrode. The denotation "VD" can refer to the pattern feature of drain electrode.

As shown in FIG. 3A, the PO region extends along the Y axis. The MD region extends along the Y axis. The width of the MD region can be greater than the width of the PO region. The OD region extends along the X axis. The M0 region extends along the X axis. The width of the OD region can be greater than the width of the M0 region. The VG region can at least be defined by intersection between the PO region and the M0 region. The VD region can at least be defined by intersection between the MD region and the M0 region. The NW region can have a rectangular shape overlapping some regions of the OD region, the PO region, the MD region and the M0 region.

In some embodiments, each of the PO regions has a width W1. The width W1 can be defined as a minimum PO width. The widths of the PO regions can be substantially the same. In other embodiments, the widths of the PO regions can be different, and the cell pitch can be defined as the minimum space between each PO.

In some embodiments, a gap with distance D1 is arranged between two adjacent PO regions. The distance D1 can be defined as a cell pitch of the layout 30. The distance D1 of the PO regions can be substantially the same. In other embodiments, the distance D1 of the PO regions can be different, and the cell pitch can be defined as the minimum distance D1 of the PO regions.

Figure 3B:
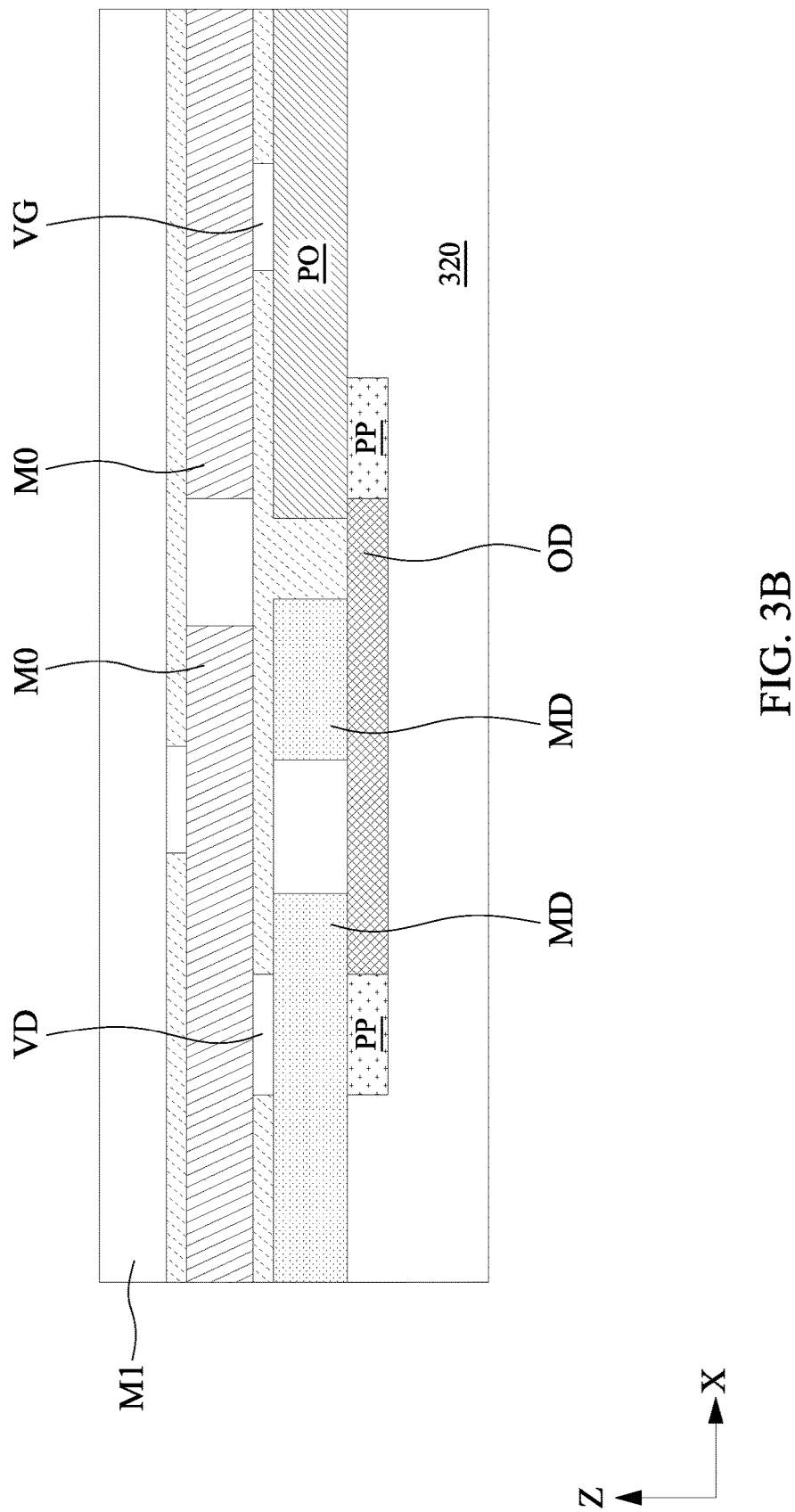
FIG. 3B illustrates a cross-section view of a semiconductor product, in accordance with some embodiments of the present disclosure.

FIG. 3B illustrates a cross-section view of a semiconductor device 30A, in accordance with some embodiments of the present disclosure corresponding to a layout. The OD region and the PP region are formed or embedded within the well region 320. The well region 320 is N-type. The PP region can refer to P-type implant structure. The OD region is formed between two PP regions. The implant concentration of the PP region is higher than the implant concentration of the well region 320. The PP region and the well region 320 have different type of implants.

In other embodiments, the well region 320 can be P-type. The OD region is formed between two NP regions. The NP region can refer to N-type implant structure. The implant concentration of the NP region is higher than the implant concentration of the well region 320. The NP region and the well region 320 have different type of implants.

The MD region can be formed above a portion of the OD region and the PP region. The PO region can be formed above a portion of the well region 320 and the PP region. The VD region can be formed to cover at least a portion of the MD region. The VG region can be formed to cover at least a portion of the PO region. The M0 region can be formed above the VD region and the VG region.

Now return to FIG. 3A, the PP region can be formed within the NW region. Specifically, three quarters of the NW region 310 are overlapped with the PP region. The line 302 indicates the boundary of the PP region and the NW region 310. An NW region and an N-type implant region may be called N well strap. The N well strap can also be found at the portion 314. In other embodiments, the P well region and the P-type implant region can be called P well strap. The P well strap and the N well strap have the same type of well region and implant region.

In some embodiments, a first set of pattern features includes at least one of N-type well, P-type well, oxide diffusion structure and gate structure. The cell level group LG1 corresponding to the first set of pattern features can be used to determine a first number of cell units. In some embodiments, each of the first number of cell units can be compatible or exchangeable with each other. The pattern features of the first number of cell units can be identical or substantially the same. The pitches of the first number of cell units can be identical or substantially the same.

More specifically, the first number of cell units share common or identical pattern features. The pattern features can be characterized by shape or position of certain particular patterns. In some embodiments, the shape of the pattern features of each one of the first number of cell units are identical to each other. The position of the pattern features of each one of the first number of cell units are identical to each other. The number of the pattern features of each one of the first number of cell units are identical to each other. The configuration of the pattern features of each one of the first number of cell units are identical to each other.

Figure 4:
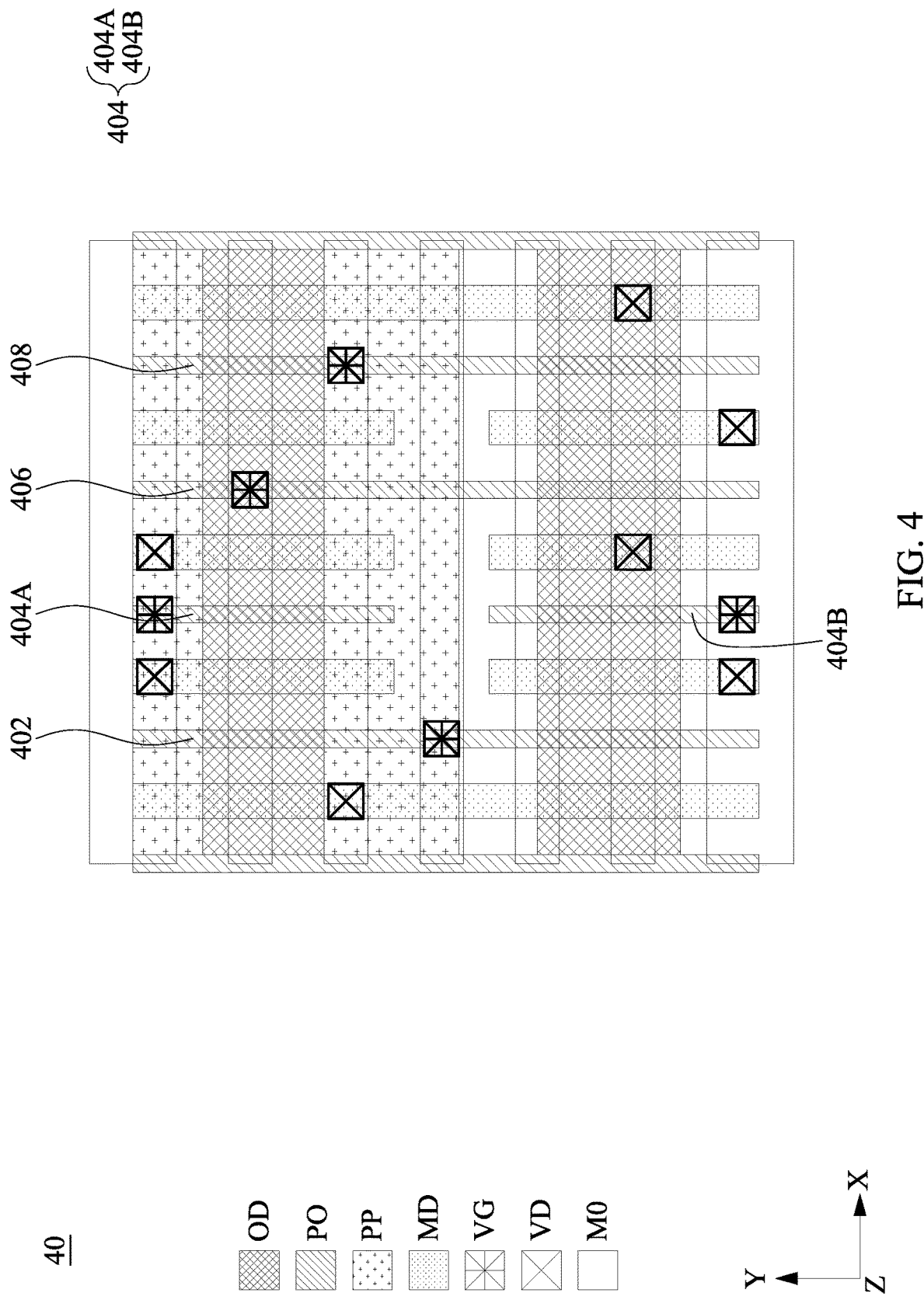
FIG. 4 illustrates a top view of a layout for semiconductor manufacturing, in accordance with some embodiments of the present disclosure.

FIG. 4 illustrates a top view of a layout 40 for semiconductor manufacturing, in accordance with some embodiments of the present disclosure. The PO region extends along the Y axis. The MD region extends along the Y axis. In the X direction, the width of the MD region can be greater than the width of the PO region. The OD region extends along the X axis. The M0 region extends along the X axis. In the Y direction, the width of the OD region can be greater than the width of the M0 region. The VG region can at least be defined by intersection between the PO region and the M0 region. The VD region can at least be defined by intersection between the MD region and the M0 region.

In some embodiments, PP region is arranged on half of the layout 40. The PP region can belong to a second set of pattern features. The PP region does not belong to the first set of pattern features. The PP region is excluded from the first set of pattern features. The second set of pattern features is more than the first set of pattern features.

In other embodiments, the NP region can belong to the second set of pattern features. The NP region does not belong to the first set of pattern features. The NP region is excluded from the first set of pattern features. The second set of pattern features is more than the first set of pattern features.

In some embodiments, the N well strap can be excluded by the second set of pattern features. In some embodiments, the P well strap can be excluded by the second set of pattern features. Therefore, the criteria for determining the second set of pattern features is more restrict than that for determining the first set of pattern features.

In some embodiments, the second set of pattern features comprises at least one of N-type implant structure and P-type implant structure. The cell level group LG2 corresponding to the second set of pattern features can be used to determine a second number of cell units. In some embodiments, each of the second number of cell units can be compatible or exchangeable with each other. The pattern features of the second number of cell units can be identical or substantially the same. The pitches of the second number of cell units can be identical or substantially the same. The second number of cell units share common or identical pattern features.

In some embodiments, the layout 40 has the PP region and corresponds to the second set of pattern features. In some embodiments, the layout 40 lacks the N well strap and corresponds to the second set of pattern features. The second number of cell units complying with the second set of pattern features are less than the first number of cell units complying with the first set of pattern features. In other embodiments, a library including the first and second cell units can be generated.

The design for the layout becomes more efficient because the first and second cell units are compatible respectively. Compared to other types of cell units which are fixed and not compatible, it saves more time from trial and error procedures to find the most effective cell unit with specific patterns or features. Moreover, the number of libraries recording the compatible cell units can be reduced to one. However, several libraries may be required for the fixed and non-compatible cell units.

Furthermore, when selecting the fixed and non-compatible cell units as a base, it is required to use the multiple of the cell pitches, and the cell area can be large. When selecting the compatible cell units as a base, it is not required to use the multiple of the cell pitches, the cell area can be reduced, and the cell pitch of the cell unit can be designed flexibly.

In addition, due to the multiple of the non-compatible cell pitches, a newly-inserted cell may need to combine several cell units which results in long signal path. However, the signal path and the cell area can be decreased by applying the compatible cell units. Moreover, the routing for connecting the cell units can also be reduced.

Figure 5:
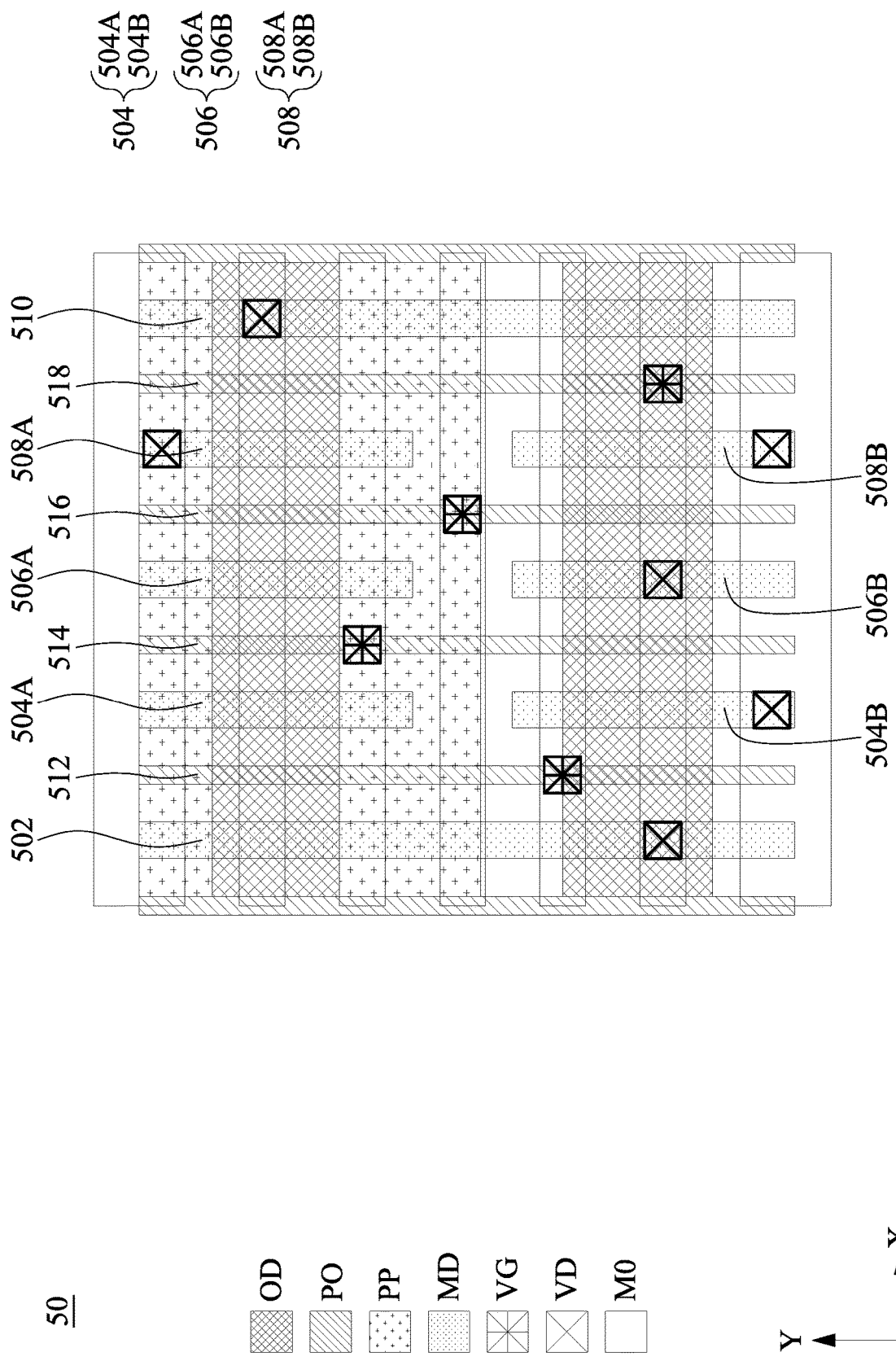
FIG. 5 illustrates another top view of a layout for semiconductor manufacturing, in accordance with some embodiments of the present disclosure.

FIG. 5 illustrates another top view of a layout 50 for semiconductor manufacturing, in accordance with some embodiments of the present disclosure. The layout 50 is similar to the layout 40 of FIG. 4 except the PO regions. The layout 50 includes gate structures 512, 514, 516, and 518. Each of the gate structures 512, 514, 516, and 518 extends along the Y uninterruptedly. Each of the gate structures 512, 514, 516, and 518 is continuous. Each of the gate structures 512, 514, 516, and 518 lacks gap and stop.

Now return to FIG. 4, the layout 40 may include gate structures 402, 404, 406 and 408. The gate structures 402, 406 and 408 extend along the Y uninterruptedly. The gate structure 404 extends along the Y interruptedly because the gate structure 404 includes two separated gate structures 404A and 404B. The gate structures 402, 406 and 408 are continuous. The gate structures 402, 406 and 408 lack gap and stop. The gate structure 404 is discrete. Gap or stop exists between the two separated gate structures 404A and 404B. Different signals may be applied for the separated gate structures 404A and 404B.

In some embodiments, continuous gate structure can be included by a third set of pattern features. The discrete gate structure can be excluded by the third set of pattern features. Therefore, the criteria for determining the third set of pattern features is more restrict than that for determining the second set of pattern features. The third set of pattern features can be more than the second set of pattern features.

In some embodiments, the cell level group LG3 corresponding to the third set of pattern features can be used to determine the third number of cell units. In some embodiments, each of the third number of cell units can be compatible or exchangeable with each other. The pattern features of the third number of cell units can be identical or substantially the same. The pitches of the third number of cell units can be identical or substantially the same. The third number of cell units share common or identical pattern features.

Figure 6:
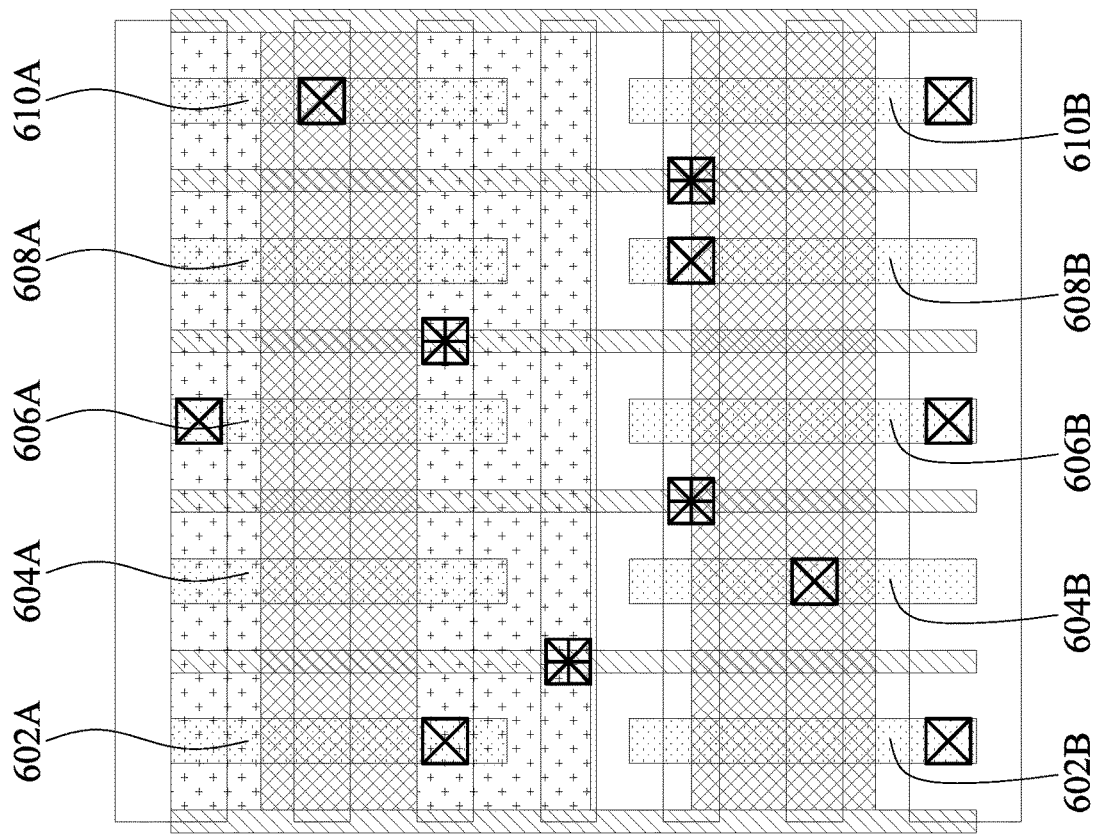
FIG. 6 illustrates another top view of a layout for semiconductor manufacturing, in accordance with some embodiments of the present disclosure.
Figure 6:
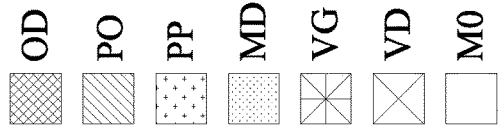
Figure 6:
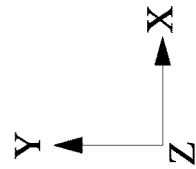

FIG. 6 illustrates another top view of a layout 60 for semiconductor manufacturing, in accordance with some embodiments of the present disclosure. The layout 60 is similar to the layout 50 of FIG. 5 except the MD regions. The layout 60 may include drain/source structures 602A, 604A, 606A, 608A, 610A, 602B, 604B, 606B, 608B, and 610B. Each of the drain/source structures 602A to 610B extends along the Y interruptedly. Each of the drain/source structures 602A to 610B is discrete. Gap or stop exists between the drain/source structures 602A and 602B. Gap or stop exists between the drain/source structures 604A and 604B. Gap or stop exists between the drain/source structures 606A and 606B. Gap or stop exists between the drain/source structures 608A and 608B. Gap or stop exists between the drain/source structures 610A and 610B.

Now return to FIG. 5, the layout 50 includes drain/source structures 502, 504, 506, 508, and 510. The drain/source structures 502 and 510 extend along the Y uninterruptedly. The drain/source structures 504 to 508 extend along the Y interruptedly because, for example, the drain/source structure 504 includes two separated drain/source structure 504A and 504B. The drain/source structures 502 and 510 are continuous. The drain/source structures 502 and 510 lack gap and stop. The drain/source structures 504 to 508 are discrete. Gap or stop exists between the two separated drain/source structures 504A and 504B. Gap or stop exists between the two separated drain/source structures 506A and 506B. Gap or stop exists between the two separated drain/source structures 508A and 508B. Different signals may be applied for the separated drain/source structures 504A and 504B. Different signals may be applied for the separated drain/source structures 506A and 506B. Different signals may be applied for the separated drain/source structures 508A and 508B.

In some embodiments, discrete drain/source structure can be included by a fourth set of pattern features. The continuous drain/source structure can be excluded by the fourth set of pattern features. Therefore, the criteria for determining the fourth set of pattern features is more restrict than that for determining the third set of pattern features. The fourth set of pattern features can be more than the third set of pattern features.

In some embodiments, the cell level group LG4 corresponding to the fourth set of pattern features can be used to determine the fourth number of cell units. In some embodiments, each of the fourth number of cell units can be compatible or exchangeable with each other. The pattern features of the fourth number of cell units can be identical or substantially the same. The pitches of the fourth number of cell units can be identical or substantially the same. The fourth number of cell units share common or identical pattern features.

Figure 7:
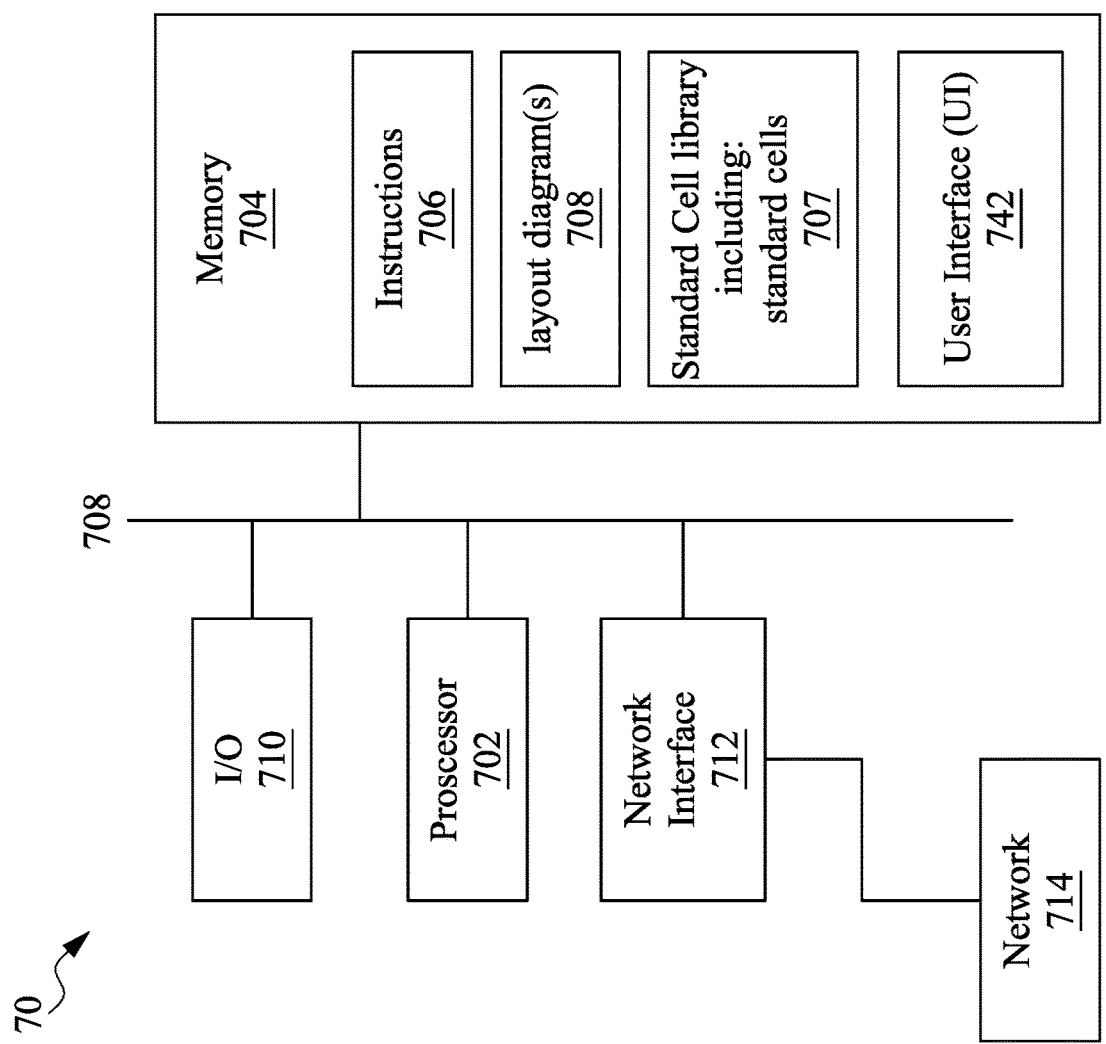
FIG. 7 is a block diagram of a system of designing a semiconductor device, in accordance with some embodiments.

FIG. 7 is a block diagram of a system 70 of designing a semiconductor device, in accordance with some embodiments. FIG. 7 is a block diagram of a system 70 of designing a semiconductor device, in accordance with some embodiments. The system 70 can include, for example, an electronic design automation (EDA) system.

In some embodiments, system 70 includes an automatic placement and routing (APR) system. Methods described herein of generating PG layout diagrams, in accordance with one or more embodiments, are implementable, for example, using the system 70, in accordance with some embodiments.

In some embodiments, the system 70 is a general purpose computing device including a hardware processor 702 and a memory 704. Memory 704 may be a computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of a method according to an embodiment, e.g., the methods described herein in accordance with one or more embodiments. (hereinafter, the noted processes and/or methods).

Processor 702 may be electrically coupled to computer-readable storage medium 704 via bus 708. Processor 702 may be electrically coupled to an I/O interface 410 by bus 708. A network interface 712 may be electrically connected to processor 702 via bus 708. Network interface 712 may be connected to a network 714, so that processor 702 and computer-readable storage medium 704 are capable of connecting to external elements via network 714. Processor 702 may be configured to execute computer program code 706 encoded in computer-readable storage medium 704 in order to cause system 70 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or semiconductor system (or apparatus or device). For example, computer-readable storage medium 704 may include a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 may store computer program code (instructions) 706 configured to cause system 70 (where such execution represents, at least in part, the EDA tool) to be usable for performing a portion or all of the noted processes and/or methods. In one or more embodiments, storage medium 704 may store information which facilitates performing a portion or all of the noted processes and/or methods. In one or more embodiments, storage medium 704 may store library 707 of standard cells including such standard cells as disclosed herein and one or more layout diagrams 708 such as are disclosed herein.

System 70 may include I/O interface 710. I/O interface 710 may be coupled to external circuitry. In one or more embodiments, I/O interface 710 may include a keyboard, keypad, mouse, trackball, trackpad, touchscreen, and/or cursor direction keys for communicating information and commands to processor 702.

System 70 may include network interface 712 coupled to processor 702. Network interface 712 may allow system 70 to communicate with network 714, to which one or more other computer systems are connected. Network interface 712 may include wireless network interfaces such as BLUETOOTH, WIFI, WIMAX, GPRS, or WCDMA. Network interface 712 may include wired network interfaces such as ETHERNET, USB, or IEEE-1364. In one or more embodiments, a portion or all of noted processes and/or methods, is implemented in two or more systems 70.

System 70 may be configured to receive information through I/O interface 710. The information received through I/O interface 710 may include one or more of instructions, data, design rules, libraries of standard cells, and/or other parameters for processing by processor 702. The information may be transferred to processor 702 via bus 708. System 70 may be configured to receive information related to a UI through I/O interface 710. The information may be stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods are implemented as a software application running on System 70. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium may include, but not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
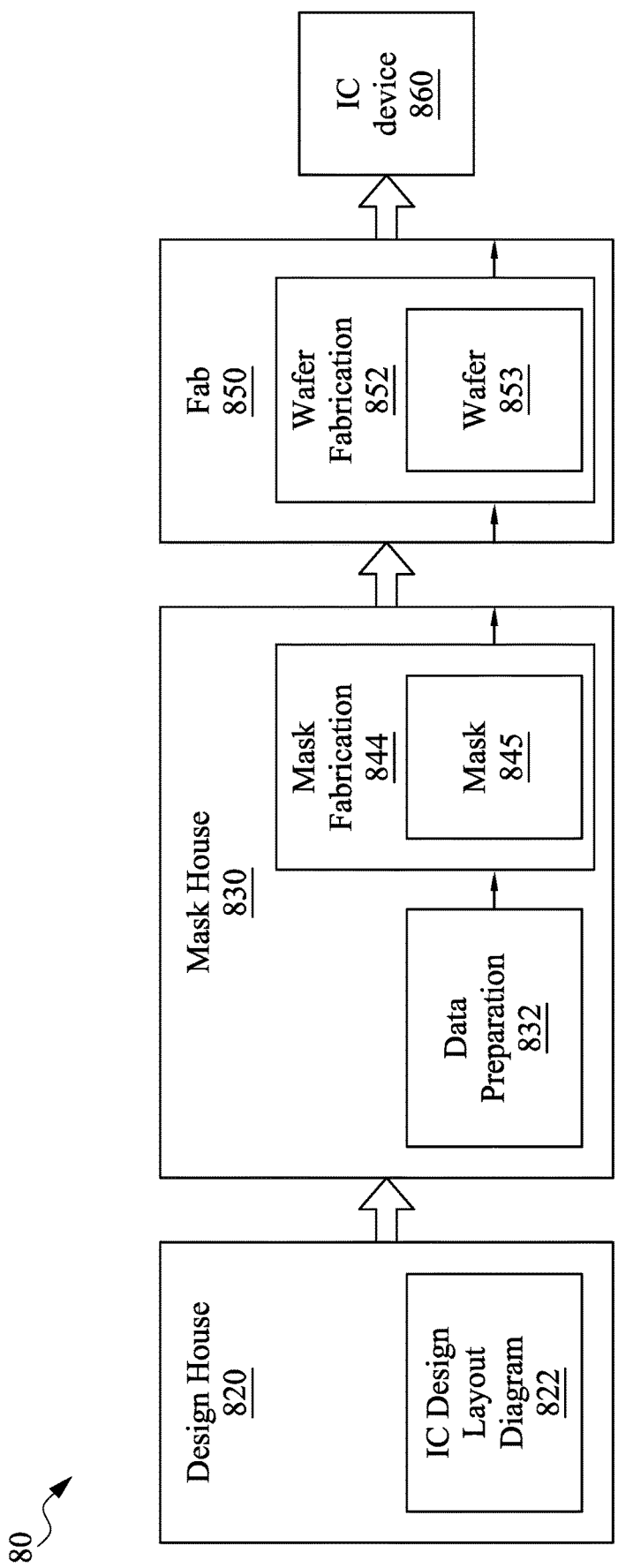
FIG. 8 is a block diagram of a semiconductor device manufacturing system, and a semiconductor device flow associated therewith, in accordance with some embodiments.

FIG. 8 is a block diagram of a semiconductor device manufacturing system 80, and a semiconductor device flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 80.

In FIG. 8, IC manufacturing system 80 includes entities, such as a design house 820, a mask house 830, and an IC manufacturer/fabricator ("fab") 850, that interact with one another in the design, development, and manufacturing cycles and/or services related to manufacturing an IC device 860. The entities in system 80 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single company. In some embodiments, two or more of design house 820, mask house 830, and IC fab 850 coexist in a common facility and use common resources.

Design house (or design team) 820 may generate an IC design layout diagram 822. IC design layout diagram 822 may include various geometrical patterns designed for a semiconductor device or an IC device 860. The geometrical patterns correspond to patterns of metal, oxide, or semiconductor layers that make up the various components of IC device 860 to be fabricated. The various layers may be combined to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 may implement a proper design procedure to form IC design layout diagram 822. The design procedure may include one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 may include data preparation 832 and mask fabrication 844. Mask house 830 may use IC design layout diagram 822 to manufacture one or more masks 845 to be used for fabricating the various layers of IC device 860 according to IC design layout diagram 822. Mask house 830 may perform mask data preparation 832, where IC design layout diagram 822 is translated into a representative data file ("RDF"). Mask data preparation 832 may provide the RDF to mask fabrication 844. Mask fabrication 844 may include a mask writer. A mask writer may convert the RDF to an image on a substrate, such as a mask (reticle) 845 or a semiconductor wafer 853. The design layout diagram 822 may be manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the foregoing description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The masks generated by mask fabrication 844 are used in a variety of processes. For example, such a mask(s) can be used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabricator that includes one or more manufacturing facilities for the fabrication of a variety of different IC products. In some embodiments, IC Fab 850 can be a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Figure 9:
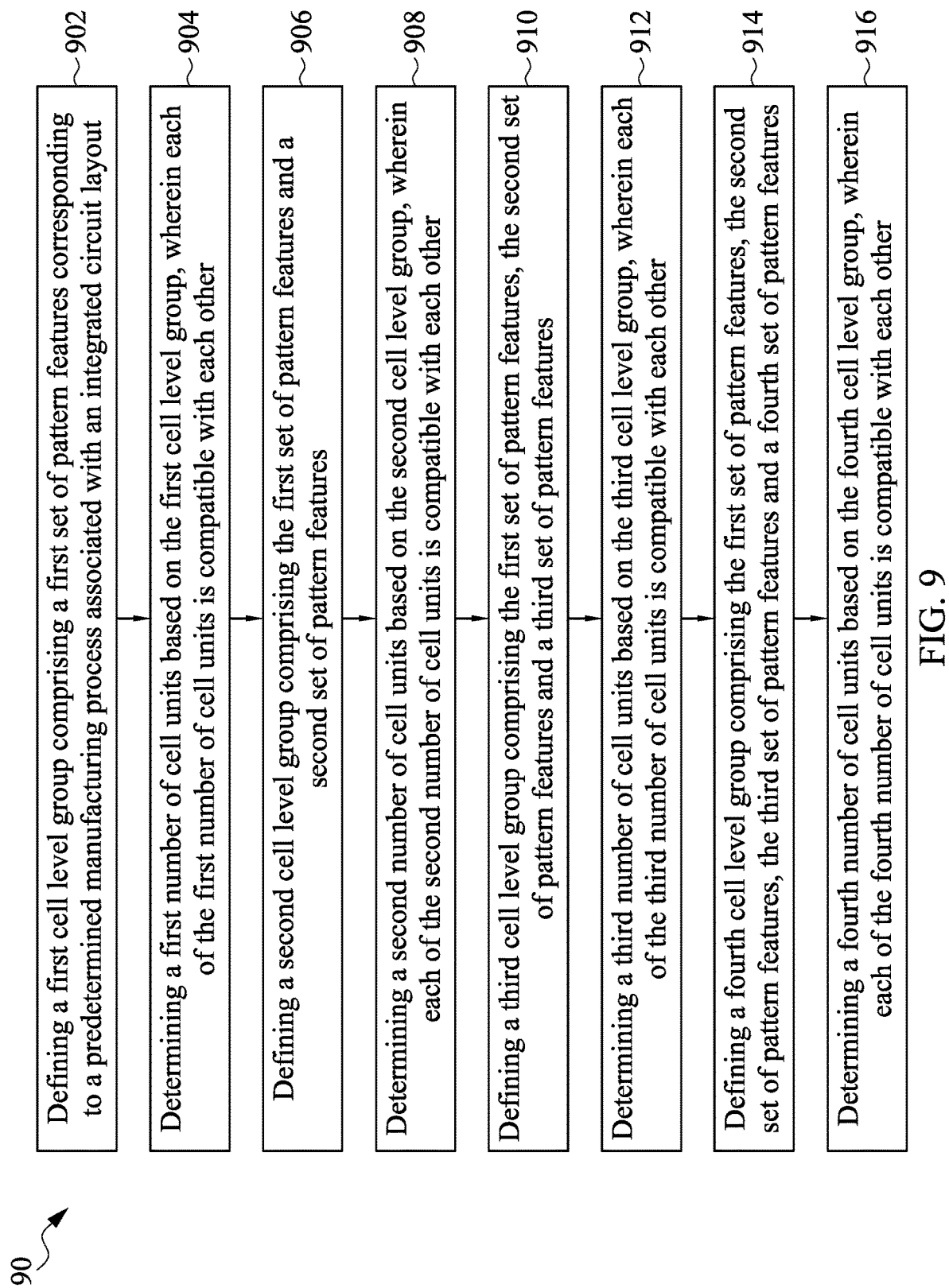
FIG. 9 illustrates a flow chart including operations for semiconductor manufacturing, in accordance with some embodiments of the present disclosure.

FIG. 9 illustrates a flow chart 90 including operations for semiconductor manufacturing, in accordance with some embodiments of the present disclosure. In operation 902, a first cell level group including a first set of pattern features corresponding to a predetermined manufacturing process associated with an integrated circuit layout is defined. In operation 904, a first number of cell units is determined based on the first cell level group, and each of the first number of cell units is compatible with each other. In operation 906, a second cell level group including the first set of pattern features and a second set of pattern features is defined. In operation 908, a second number of cell units is determined based on the second cell level group, and each of the second number of cell units is compatible with each other.

In operation 910, a third cell level group is defined which includes the first set of pattern features, the second set of pattern features and a third set of pattern features. In operation 912, a third number of cell units is determined based on the third cell level group, and each of the third number of cell units is compatible with each other. In operation 914, a fourth cell level group is defined which includes the first set of pattern features, the second set of pattern features, the third set of pattern features and a fourth set of pattern features. In operation 916, a fourth number of cell units is defined based on the fourth cell level group, and each of the fourth number of cell units is compatible with each other.

Figure 10:
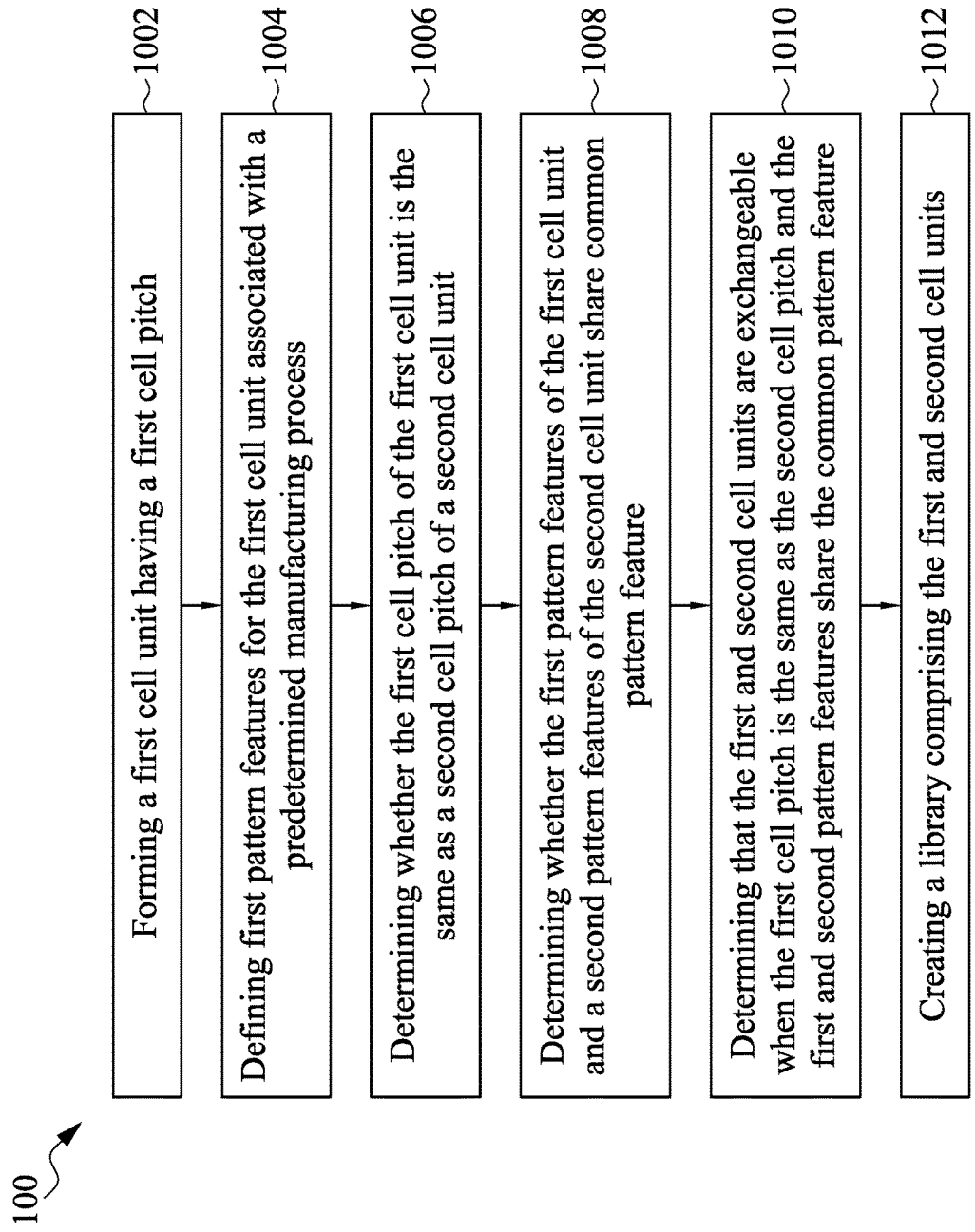
FIG. 10 illustrates another flow chart including operations for semiconductor manufacturing, in accordance with some embodiments of the present disclosure.

FIG. 10 illustrates another flow chart 100 including operations for semiconductor manufacturing, in accordance with some embodiments of the present disclosure. In operation 1002, a first cell unit having a first cell pitch is formed. In operation 1004, first pattern features are defined for the first cell unit associated with a predetermined manufacturing process. In operation 1006, whether the first cell pitch of the first cell unit is the same as a second cell pitch of a second cell unit is determined.

In operation 1008, whether the first pattern features of the first cell unit and a second pattern features of the second cell unit share common pattern feature is determined. In operation 1010, the first and second cell units are exchangeable when the first cell pitch is the same as the second cell pitch and the first and second pattern features share the common pattern feature. In operation 1012, a library including the first and second cell units is created.

Some embodiments of the present disclosure provide a method for semiconductor manufacturing. The method includes defining a first cell level group comprising a first set of pattern features corresponding to a predetermined manufacturing process associated with an layout; determining a first number of cell units based on the first cell level group, wherein each of the first number of cell units is compatible with each other; defining a second cell level group comprising the first set of pattern features and a second set of pattern features; and determining a second number of cell units based on the second cell level group, wherein each of the second number of cell units is compatible with each other. The first set of pattern features and the second set of pattern features are arranged in responsive to sequential operations of the predetermined manufacturing process.

Some embodiments of the present disclosure provide a method for semiconductor manufacturing. The method includes forming a first cell unit having a first cell pitch; defining first pattern features for the first cell unit associated with a predetermined manufacturing process; determining whether the first cell pitch of the first cell unit is the same as a second cell pitch of a second cell unit; determining whether the first pattern features of the first cell unit and a second pattern features of the second cell unit share common pattern feature; and determining that the first and second cell units are exchangeable when the first cell pitch is the same as the second cell pitch and the first and second pattern features share the common pattern feature.

Some embodiments of the present disclosure provide a system for arranging a layout. The system includes at least one processing unit and at least one memory including computer program code for one or more programs. The at least one memory, the computer program code and the at least one processing unit are configured to cause the system to perform: defining a first cell level group comprising a first set of pattern features corresponding to a predetermined manufacturing process associated with the layout; forming a first number of cell units; and determining that the first number of cell units are compatible with each other when complying with the first set of pattern features.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for semiconductor manufacturing, comprising:

dividing the semiconductor manufacturing into a first cell level group, a second cell level group, a third cell level group, and a fourth cell level group;
defining the first cell level group comprising a first set of pattern features corresponding to a predetermined manufacturing process of the semiconductor manufacturing associated with a layout;
determining a first number of cell units based on the first cell level group, wherein each of the first number of cell units is compatible with each other;
defining the second cell level group comprising the first set of pattern features and a second set of pattern features; and
determining a second number of cell units based on the second cell level group, wherein each of the second number of cell units is compatible with each other,
wherein the first set of pattern features and the second set of pattern features are arranged in responsive to sequential operations of the predetermined manufacturing process.

2. The method of claim 1, wherein the first set of pattern features comprises at least one of N-type well, P-type well, oxide diffusion structure and gate structure.

3. The method of claim 2, wherein the second set of pattern features comprises at least one of N-type implant structure and P-type implant structure.

4. The method of claim 1, further comprising:
defining the third cell level group comprising the first set of pattern features, the second set of pattern features and a third set of pattern features, wherein the first set of pattern features, the second set of pattern features and the third set of pattern features are arranged in responsive to the sequential operations of the predetermined manufacturing process; and
determining a third number of cell units based on the third cell level group, wherein each of the third number of cell units is compatible with each other.

5. The method of claim 4, wherein the third set of pattern features comprises a gate structure, and discrete gate structure is excluded from the third set.

6. The method of claim 4, further comprising:
defining the fourth cell level group comprising the first set of pattern features, the second set of pattern features, the third set of pattern features and a fourth set of pattern features, wherein the first set of pattern features, the second set of pattern features, the third set of pattern features and the fourth set of pattern features are arranged in responsive to the sequential operations of the predetermined manufacturing process; and
determining a fourth number of cell units based on the fourth cell level group, wherein each of the fourth number of cell units is compatible with each other.

7. The method of claim 6, wherein the fourth set of pattern features comprises a drain/source structure, and continuous drain/source structure is excluded from the fourth set.

8. The method of claim 1, wherein the first number of cell units and the second number of cell units have the same cell pitch.

9. The method of claim 6, wherein the first number of cell units, the second number of cell units, the third number of cell units and the fourth number of cell units are configured to form a logic circuit.

10. A system for arranging a layout, comprising:
at least one processing unit; and
at least one memory including computer program code for one or more programs;
wherein the at least one memory, the computer program code and the at least one processing unit are configured to cause the system to perform:
dividing a semiconductor manufacturing associated with the layout into a first cell level group, a second cell level group, a third cell level group, and a fourth cell level group;
defining the first cell level group comprising a first set of pattern features corresponding to a predetermined manufacturing process of the semiconductor manufacturing associated with the layout;
forming a first number of cell units; and
determining that the first number of cell units are compatible with each other when complying with the first set of pattern features.

11. The system of claim 10, wherein the at least one memory, the computer program code and the at least one processing unit are further configured to cause the system to:
define the second cell level group comprising the first set of pattern features and a second set of pattern features corresponding to the predetermined manufacturing process, wherein the first set of pattern features and the second set of pattern features are arranged in responsive to sequential operations of the predetermined manufacturing process; and
determine a second number of cell units based on the second cell level group, wherein the second number is smaller than the first number.

12. The system of claim 11, wherein the second set of pattern features comprises at least one of N-type implant structure and P-type implant structure.

13. The system of claim 11, wherein the at least one memory, the computer program code and the at least one processing unit are further configured to cause the system to:
define the third cell level group comprising the first set of pattern features, the second set of pattern features and a third set of pattern features corresponding to the predetermined manufacturing process, wherein the first set of pattern features, the second set of pattern features and the third set of pattern features are arranged in responsive to the sequential operations of the predetermined manufacturing process; and
determine a third number of cell units based on the third cell level group, wherein the third number is smaller than the second number.

14. The system of claim 13 wherein the third set of pattern features comprises a gate structure, and discrete gate structure is excluded from the third set.

15. A method for semiconductor manufacturing, comprising:
dividing the semiconductor manufacturing into a first cell level group, a second cell level group, a third cell level group, and a fourth cell level group;
defining the first cell level group comprising a first set of pattern features corresponding to a predetermined manufacturing process of the semiconductor manufacturing associated with a layout;
determining a first number of cell units based on the first cell level group, wherein each of the first number of cell units is compatible with each other;
defining the second cell level group comprising the first set of pattern features and a second set of pattern features;
determining a second number of cell units based on the second cell level group, wherein each of the second number of cell units is compatible with each other;

defining the third cell level group comprising the first set of pattern features, the second set of pattern features and a third set of pattern features, wherein the first set of pattern features, the second set of pattern features and the third set of pattern features are arranged in responsive to sequential operations of the predetermined manufacturing process; and determining a third number of cell units based on the third cell level group, wherein each of the third number of cell units is compatible with each other.

16. The method of claim 15, wherein the first set of pattern features comprises at least one of N-type well, P-type well, oxide diffusion structure and gate structure.

17. The method of claim 16, wherein the second set of pattern features comprises at least one of N-type implant structure and P-type implant structure.

18. The method of claim 17, wherein the third set of pattern features comprises the gate structure, and discrete gate structure is excluded from the third set.

19. The method of claim 18, further comprising:

defining the fourth cell level group comprising the first set of pattern features, the second set of pattern features, the third set of pattern features and a fourth set of pattern features, wherein the first set of pattern features, the second set of pattern features, the third set of pattern features and the fourth set of pattern features are arranged in responsive to the sequential operations of the predetermined manufacturing process; and determining a fourth number of cell units based on the fourth cell level group, wherein each of the fourth number of cell units is compatible with each other.

20. The method of claim 19, wherein the fourth set of pattern features comprises a drain/source structure, and continuous drain/source structure is excluded from the fourth set.

* * * * *